(12) United States Patent
Moore (10) Patent No.: US 6,449,589 B1
(45) Date of Patent: Sep. 10, 2002

(54) ELIMINATION OF LEFT RECURSION FROM CONTEXT-FREE GRAMMARS

(75) Inventor: Robert C. Moore, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/441,685

(22) Filed: Nov. 16, 1999

(51) Int. Cl.$^7$ ................................................ G06F 17/27
(52) U.S. Cl. .......................................... 704/9; 704/257
(58) Field of Search ...................... 704/9–10, 1, 255, 704/257; 707/530, 531, 532

(56) References Cited

U.S. PATENT DOCUMENTS

| | | | |
|---|---|---|---|
| 4,984,178 A | * 1/1991 | Hemphill et al. | ............... 704/9 |
| 5,384,892 A | * 1/1995 | Strong | ......................... 704/255 |
| 5,475,588 A | * 12/1995 | Schabes et al. | ................. 704/9 |
| 5,907,634 A | * 5/1999 | Brown et al. | ............... 382/226 |
| 6,157,912 A | * 12/2000 | Kneser et al. | ............... 704/270 |

OTHER PUBLICATIONS

"Introduction to Automata theory, Languages, and Computation", for Addison–Wesley Publishing Company, 1979, pp. 94–99; p. 106.

"Finite–state Approximation of Constraint–based Grammars using Left–corner Grammar Transforms", by Mark Johnson, presented at COLING–ACL '98, Montreal, Quebec, Canada, Aug. 10–14, 1998, pp. 619–623.

"An Optimal Tabular Parsing Algorithm", by Mark–Jan Nederhof, presented at 32nd Annual Meeting of the Association for Computational Linguistics, Las Cruces, New Mexico, Jun. 27–30, 1994, pp. 117–124.

"Recursion", Nuance Speech Recognition System Version 5, Developer's Manual. for Nuance Communications, 1996, pp. 10–11.

* cited by examiner

Primary Examiner—Patrick N. Edouard
(74) Attorney, Agent, or Firm—Westman, Champlin & Kelly, P.A.; S. Koehler (57) ABSTRACT

A method for transforming a first set of rule expressions forming a first grammar to a second set of rule expressions forming a second grammar includes identifying at least one left-recursive category of the first grammar; and applying a left-corner transform to substantially only the left-recursive rule expressions of the first grammar in forming the second grammar.

16 Claims, 6 Drawing Sheets

ELIMINATION OF LEFT RECURSION FROM CONTEXT-FREE GRAMMARS

BACKGROUND OF THE INVENTION

The present invention relates to language modeling and parsing algorithms. More particularly, the present invention relates to eliminating left recursion from grammars or other similar models.

Accurate speech recognition by computer requires more than just an acoustic model to select the correct word spoken by the user. In other words, if a speech recognizer must choose or determine which word has been spoken, if all words have the same likelihood of being spoken, the speech recognizer will typically perform unsatisfactorily. A language model provides a method or means of specifying which sequences of words in the vocabulary are possible, or at least most likely.

Computer speech recognition is usually implemented using top-down language processing. Top-down language processing begins with the largest unit of language to be recognized, such as a sentence, and processes it by analyzing it into smaller units, such as phrases, which in turn, are analyzed into yet smaller units, such as words.

One common technique of classifying is to use a formal grammar. The formal grammar defines the sequence of words that the application will allow. One particular type of grammar is known as a "context-free grammar" (CFG), which allows complex linguistic patterns to be specified. However, topdown language processing systems that use a context free grammar do not permit "left recursion" within the grammar. "Left recursion" is present in a CFG when a definition of a category can begin with a smaller phrase of the same category. In the English language, "left recursion" can be illustrated by the following CFG:

S→NP VP [A sentence (S) can consist of a noun phrase (NP) followed by a verb phrase (VP).]

NP→Det N [A noun phrase can consist of a determiner (Det) followed by a noun (N).]

Det→NP's [A determiner can consist of a noun phrase followed by "'s"]

Figure 1:
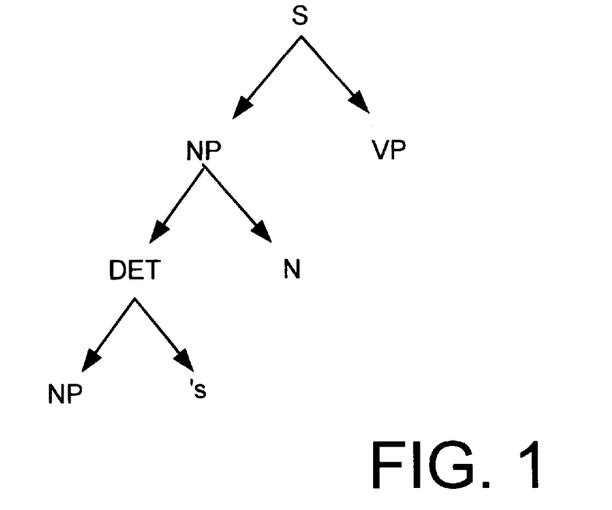
FIG. 1 is a pictorial representation of left recursion.

FIG. 1 is a pictorial representation of the rules or rule expressions above. "Left recursion" is present in this partial grammar because the definition of a noun phrase (NP) includes a determiner (DET), the definition of which includes a noun phrase in the left-most position on the right-hand side of the rule expression. Augmented with appropriate additional rule expressions and dictionary entries, this grammar will define such sentences as:

"John sleeps."

"John's mother sleeps."

"John's mother's dog sleeps."

"Left recursion" cannot be directly coded in the grammar and used by a top-down language processing engine. However, it has been known how to transform a CFG having left recursion into Greibach normal form. (Transforming a grammar results in a different grammar that permits the same sequence of words.) Greibach normal form is non-left-recursive. Unfortunately, converting a CFG to Greibach normal form can realize a grammar that is far too large to be used, or sometimes, even completely generated. In other words, the resulting CFG contains or would contain too many rules to define the desired sentences. This situation creates two problems. First, storage capabilities may not exist for storing the complete set of rules of the transformed grammar. Second, processing or traversal of the grammar during speech recognition (or other language processing such as parsing) may take too long.

There thus is a need to improve context-free grammars used by top-down language processing systems such as speech recognizers or parsers. For instance, there is a need to transform a left-recursive context-free grammar into a non-left-recursive grammar without the latter becoming too large.

SUMMARY OF THE INVENTION

A method for transforming a first set of rule expressions forming a first grammar to a second set of rule expressions forming a second grammar includes identifying at least one left-recursive category of the first grammar; and applying a left-corner transform to substantially only the left-recursive rule expressions of the first grammar in forming the second grammar. The method can be executed on a suitable computer wherein instructions are provided on a computer readable medium.

A second broad aspect of the present invention is a method for building a language model by transforming a first set of rule expressions forming a first grammar to a second set of rule expressions forming a second grammar, the method including:

replacing a set of rule expressions of the form, $$A \to X_1\beta_1, \ldots, A \to X_n\beta_n$$

with $$A \to A\text{-non-left-rec } A\text{-non-left-rec} \to X_1\beta_1 \ldots A\text{-non-left-rec} \to X_n\beta_n$$

where A is a left-recursive category, $X_1 \ldots X_n$ are each any word or non-left-recursive category of the first grammar, $\beta_1 \ldots \beta_n$ are each a sequence (possibly a null sequence) of words and/or categories of the first grammar, and A-non-left-rec is a newly defined category. The method can be executed on a suitable computer wherein instructions are provided on a computer readable medium.

DETAILED DESCRIPTION OF ILLUSTRATIVE EMBODIMENTS

Figure 2:
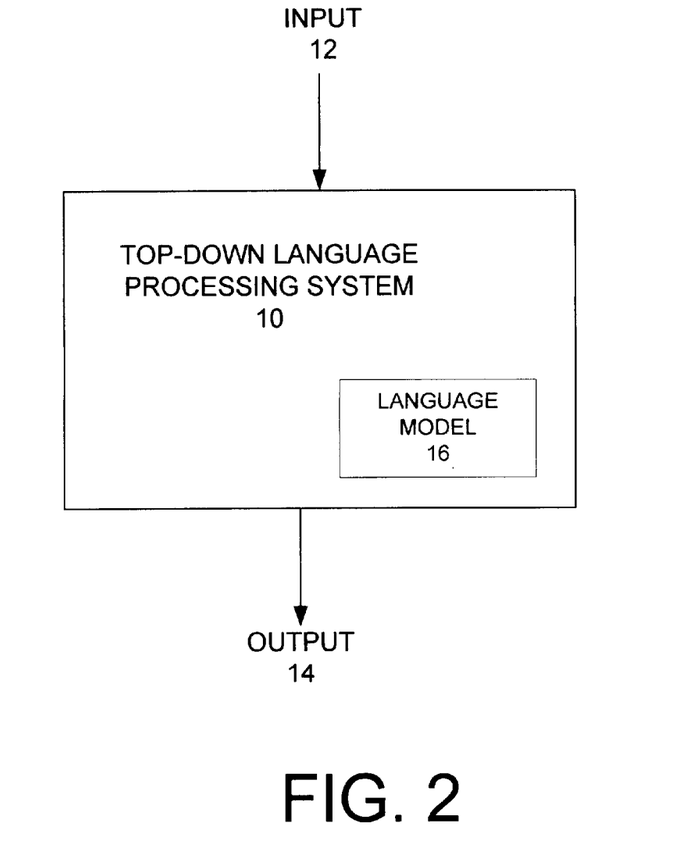
FIG. 2 is a block diagram of a top-down language processing system.

FIG. 2 generally illustrates a top-down language processing system 10 that receives a language input 12 and processes the language input 12 to provide a language output 14. For example, the top-down language processing system 10 can be embodied as a speech recognition system or module that receives as the language input 12 spoken or recorded language by a user. The speech recognition system processes the spoken language and provides as an output, recognized words typically in the form of a textual output.

During processing, the speech recognition system or module can access a language model 16 in order to determine which words have been spoken. The language model 16 encodes a particular language, such as English, using rule expressions or rules to define relationships and elements that comprise the language. In the embodiment illustrated, the language model 16 uses a context-free grammar, which permits complex linguistic patterns to be specified. However, as discussed in the background section, the language model 16 can have rule expressions that result in left recursion. Generally, left recursion is not allowed because of the inability of the top-down language processing system 10 to process such a model. One broad aspect of the present invention is a method of building or transforming the language model 16 in a manner to remove left recursion, while still maintaining a relatively compact language model 16 needed for efficient processing.

As appreciated by those skilled in the art, the language model 16 can be used in other top-down language processing systems besides the speech recognition system discussed above. For instance, language models are also used in natural and artificial language parsers. For example, U.S. patent application Ser. No. 08/840,117 filed Apr. 3, 1997, entitled "Text Normalization Using a Context-Free Grammar", and assigned to the same Assignee as the present application describes a system for substituting text in an input string using a context-free grammar. Other systems use language models in parsers to segment natural languages such as Chinese or Japanese. Although described below with particular reference to a speech recognition system, it is to be understood that the present invention is useful in building artificial and natural language models in these and other forms of top-down language processing systems.

Figure 3:
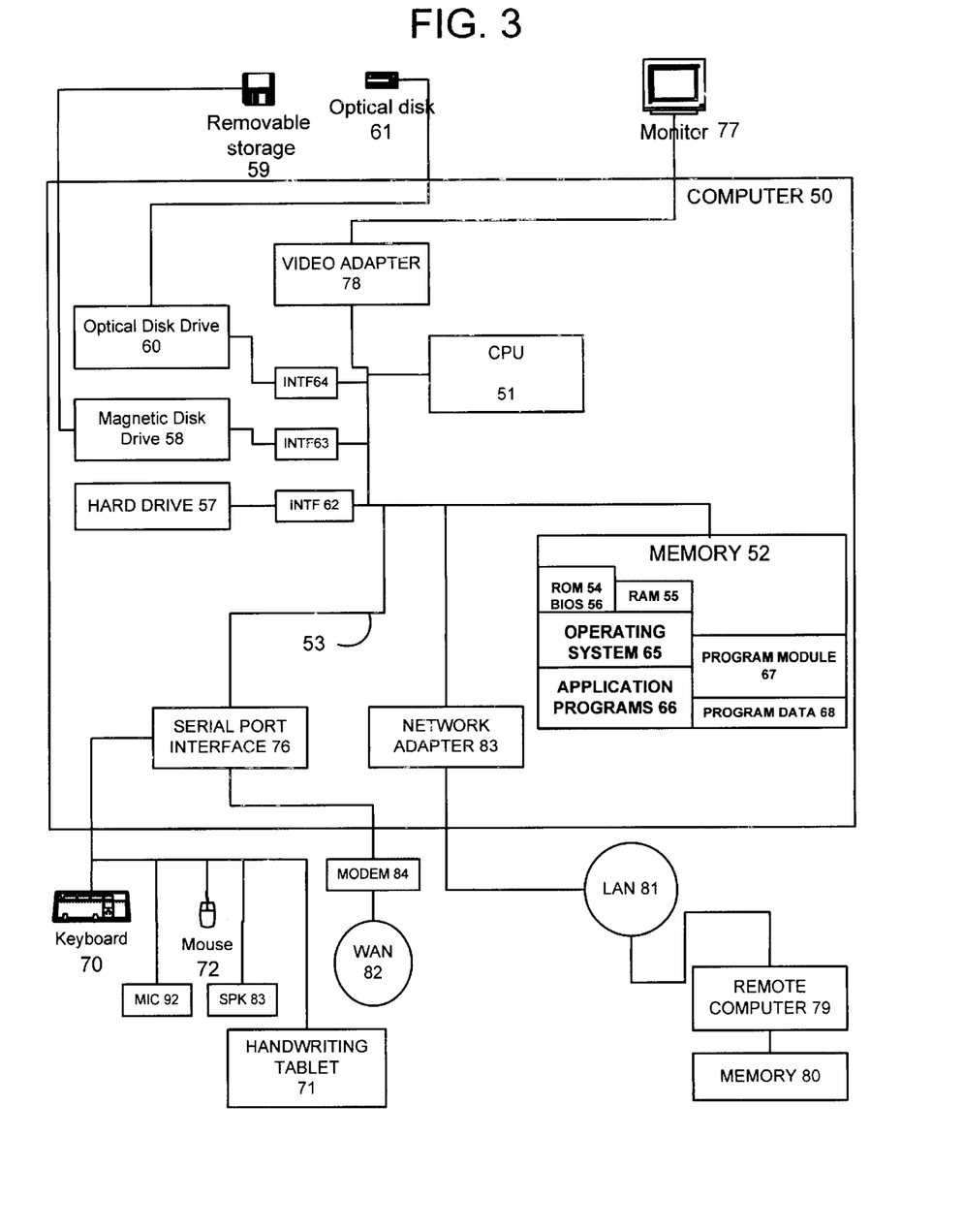
FIG. 3 is a block diagram of an exemplary computing environment.

Prior to a detailed discussion of the present invention, an overview of an operating environment may be helpful. FIG. 3 and the related discussion provide a brief, general description of a suitable computing environment in which the invention can be implemented. Although not required, the invention will be described, at least in part, in the general context of computer-executable instructions, such as program modules, being executed by a personal computer Generally, program modules include routine programs, objects, components, data structures, etc. that perform particular tasks or implement particular abstract data types. Tasks performed by the programs and modules are described below and with the aid of block diagrams and flow charts. Those skilled in the art can implement the descriptions, block diagrams and flow charts as processor executable instructions, which can be written on any form of a computer readable medium. In addition, those skilled in the art will appreciate that the invention can be practiced with other computer system configurations, including hand-held devices, multi processor systems, microprocessor-based or programmable consumer electronics, network PCs, minicomputers, mainframe computers, and the like. The invention can also be practiced in distributed computing environments where tasks are performed by remote processing devices that are linked through a communications network. In a distributed computing environment, program modules can be located in both local and remote memory storage devices.

With reference to FIG. 3, an exemplary system for implementing the invention includes a general purpose computing device in the form of a conventional personal computer 50, including a processing unit 51, a system memory 52, and a system bus 53 that couples various system components including the system memory to the processing unit 51. The system bus 53 can be any of several types of bus structures including a memory bus or memory controller, a peripheral bus, and a local bus using any of a variety of bus architectures. The system memory includes read only memory (ROM) 54 and a random access memory (RAM) 55. A basic input/output system 56 (BIOS), containing the basic routine that helps to transfer information between elements within the personal computer 50, such as during start-up, is stored in ROM 54. The personal computer 50 further includes a hard disk drive 57 for reading from and writing to a hard disk (not shown), a magnetic disk drive 58 for reading from or writing to a removable magnetic disk 59, and an optical disk drive 60 for reading from or writing to a removable optical disk such as a CD ROM or other optical media. The hard disk drive 57, magnetic disk drive 58, and optical disk drive 60 are connected to the system bus 53 by a hard disk drive interface 62, magnetic disk drive interface 63, and an optical drive interface 64, respectively. The drives and the associated computer readable media provide nonvolatile storage of computer readable instructions, data structures, program modules and other data for the personal computer 50.

Although the exemplary environment described herein employs the hard disk, the removable magnetic disk 59 and the removable optical disk 61, it should be appreciated by those skilled in the art that other types of computer readable media, which can store data that is accessible by a computer, such as magnetic cassettes, flash memory cards, digital video disks, Bernoulli cartridges, random access memories (RAMs), read only memory (ROM), and the like, can also be used in the exemplary operating environment.

A number of program modules can be stored on the hard disk, magnetic disk 59, optical disk 61, ROM 54 or RAM 55, including an operating system 65, one or more application programs 66, other program modules 67, and program data 68. A user can enter commands and information into the personal computer 50 through input devices such as a keyboard 70, a handwriting tablet 71, a pointing device 72 and a microphone 92. Other input devices (not shown) can include a joystick, game pad, satellite dish, scanner, or the like. These and other input devices are often connected to the processing unit 51 through a serial port interface 76 that is coupled to the system bus 53, but can be connected by other interfaces, such as a sound card, a parallel port, a game port or a universal serial bus (USB). A monitor 77 or other type of display device is also connected to the system bus 53 via an interface, such as a video adapter 78. In addition to the monitor 77, personal computers typically include other peripheral output devices such as a speaker 83 and a printer (not shown).

The personal computer 50 can operate in a networked environment using logic connections to one or more remote computers, such as a remote computer 79. The remote computer 79 can be another personal computer, a server, a router, a network PC, a peer device or other network node, and typically includes many or all of the elements described above relative to the personal computer 50, although only a memory storage device 80 has been illustrated in FIG. 1. The logic connections depicted in FIG. 1 include a local area network (LAN) 81 and a wide area network (WAN) 82. Such networking environments are commonplace in offices, enterprise-wide computer network Intranets and the Internet.

When used in a LAN networking environment, the personal computer 50 is connected to the local area network 81 through a network interface or adapter 83. When used in a WAN networking environment, the personal computer 50 typically includes a modem 84 or other means for establishing communications over the wide area network 82, such as the Internet. The modem 84, which can be internal or external, is connected to the system bus 53 via the serial port interface 76. In a network environment, program modules depicted relative to the personal computer 50, or portions thereof, can be stored in the remote memory storage devices. As appreciated by those skilled in the art, the network connections shown are exemplary and other means of establishing a communications link between the computers can be used.

Figure 4:
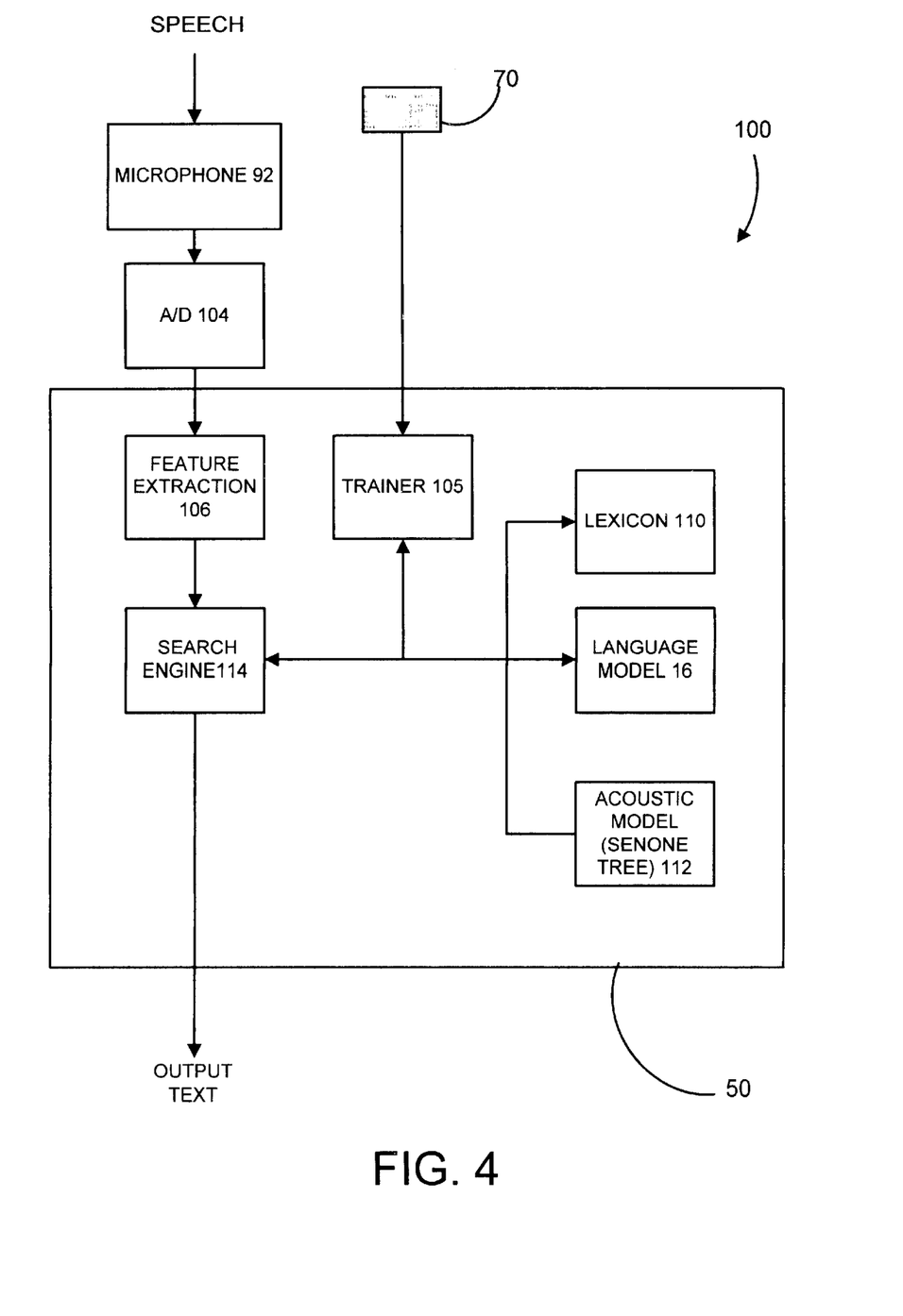
FIG. 4 is a block diagram of an exemplary speech recognition system.

An exemplary embodiment of a speech recognition system 100 is illustrated in FIG. 4. The speech recognition system 100 includes the microphone 92, an analog-to-digital (A/D) converter 104, a training module 105, feature extraction module 106, a lexicon storage module 110, an acoustic model along with senone trees 112, a tree search engine 114, and the language model 16. It should be noted that the entire system 100, or part of speech recognition system 100, can be implemented in the environment illustrated in FIG. 3. For example, microphone 92 can preferably be provided as an input device to the computer 50, through an appropriate interface, and through the A/D converter 104. The training module 105 and feature extraction module 106 can be either hardware modules in the computer 50, or software modules stored in any of the information storage devices disclosed in FIG. 3 and accessible by the processing unit 51 or another suitable processor. In addition, the lexicon storage module 110, the acoustic model 112, and the language model 16 are also preferably stored in any of the memory devices shown in FIG. 3. Furthermore, the tree search engine 114 is implemented in processing unit 51 (which can include one or more processors) or can be performed by a dedicated speech recognition processor employed by the personal computer 50.

In the embodiment illustrated, during speech recognition, speech is provided as an input into the system 100 in the form of an audible voice signal by the user to the microphone 92. The microphone 92 converts the audible speech signal into an analog electronic signal, which is provided to the A/D converter 104. The A/D converter 104 converts the analog speech signal into a sequence of digital signals, which is provided to the feature extraction module 106. In one embodiment, the feature extraction module 106 is a conventional array processor that performs spectral analysis on the digital signals and computes a magnitude value for each frequency band of a frequency spectrum. The signals are, in one illustrative embodiment, provided to the feature extraction module 106 by the A/D converter 104 at a sample rate of approximately 16 kHz.

The feature extraction module 106 divides the digital signal received from the A/D converter 104 into frames that include a plurality of digital samples. Each frame is approximately 10 milliseconds in duration. The frames are then encoded by the feature extraction module 106 into a feature vector reflecting the spectral characteristics for a plurality of frequency bands. In the case of discrete and semi-continuous Hidden Markov Modeling, the feature extraction module 106 also encodes the feature vectors into one or more code words using vector quantization techniques and a codebook derived from training data. Thus, the feature extraction module 106 provides, at its output the feature vectors (or code words) for each spoken utterance. The feature extraction module 106 provides the feature vectors (or code words) at a rate of one feature vector or (code word) approximately every 10 milliseconds.

Output probability distributions are then computed against Hidden Markov Models using the feature vector (or code words) of the particular frame being analyzed. These probability distributions are later used in executing a Viterbi or similar type of processing technique.

Upon receiving the code words from the feature extraction module 106, the tree search engine 114 accesses information stored in the acoustic model 112. The model 112 stores acoustic models, such as Hidden Markov Models, which represent speech units to be detected by the speech recognition system 100. In one embodiment, the acoustic model 112 includes a senone tree associated with each Markov state in a Hidden Markov Model. The Hidden Markov models represent, in one illustrative embodiment, phonemes. Based upon the senones in the acoustic model 112, the tree search engine 114 determines the most likely phonemes represented by the feature vectors (or code words) received from the feature extraction module 106, and hence representative of the utterance received from the user of the system.

The tree search engine 114 also accesses the lexicon stored in module 110. The information received by the tree search engine 114 based on its accessing of the acoustic model 112 is used in searching the lexicon storage module 110 to determine a word that most likely represents the codewords or feature vector received from the features extraction module 106. Also, the search engine 114 accesses the language model 16, The language model 16 is a context-free grammar that is used in identifying the most likely word represented by the input speech. The most likely word is provided as output text.

Although described herein where the speech recognition system 160 uses HMM modeling and senone trees, it should be understood that the speech recognition system 160 can take many forms and all that is required is that it uses the language model 16 and provide as an output the text spoken by the user.

As stated above, one aspect of the present invention is a method for transforming a first set of rule expressions forming a first grammar to a second set of rule expressions forming a second grammar that includes identifying at least one left-recursive category of the first grammar; and applying a leftcorner transform to substantially only the left-recursive category rule expressions of the first grammar in forming the second grammar. The left-corner grammar transform is well known and was also recently explored by Mark Johnson in "Finite-state Approximation of Constraint-based Grammars using Left-corner Grammar Transforms" published in COILING-ACL '98, Proceedings of the Conference, Association for Computational Linguistics, PP. 619–623, Aug. 10–14, 1998, which is hereby incorporated by reference in its entirety. The left-corner transform eliminates left recursion if the grammar is noncylic; however, simple application can still result in a grammar that is the square of the size of the original grammar. In particular, it has been discovered that applying the left-corner transform to portions of the grammar not having left recursion causes an unnecessary increase in the size of the resulting grammar. To avoid unnecessary increases in the size of the grammar, categories or nonterminals of the original grammar are separated into left-recursive and non-left-recursive portions. In order to minimize the number of rule expressions that have to be transformed in the original grammar, all non-left-recursive categories or nonterminals are treated as if they were terminals (words, etc.) for the purpose of applying the left-corner transform.

For purposes of this invention, the left-corner transform can be described by the following transformation rules, where "a" can be any word or other terminal of the original grammar, "A" and "B" can be any category or nonterminal of the original grammar, "X" can be any word or category of the original grammar, and β can be any sequence of zero or more words and/or categories of the original grammar:

A→a A-a is in the transformed grammar.

A-X→β A-B is in the transformed grammar,
   if B→X β is in the original grammar.

A-X→β is in the transformed grammar,
   if A→X β is in the original grammar.

All the category expressions of the form A-X and A-B represent new category symbols in the new grammar, not-existing in the original grammar. If β is a string of length zero then the sequence X β is simply X. In the case where β appears by itself on the right-hand side of a rule expression, then when it has length zero, it is represented by E, which indicates an empty string.

Figure 5:
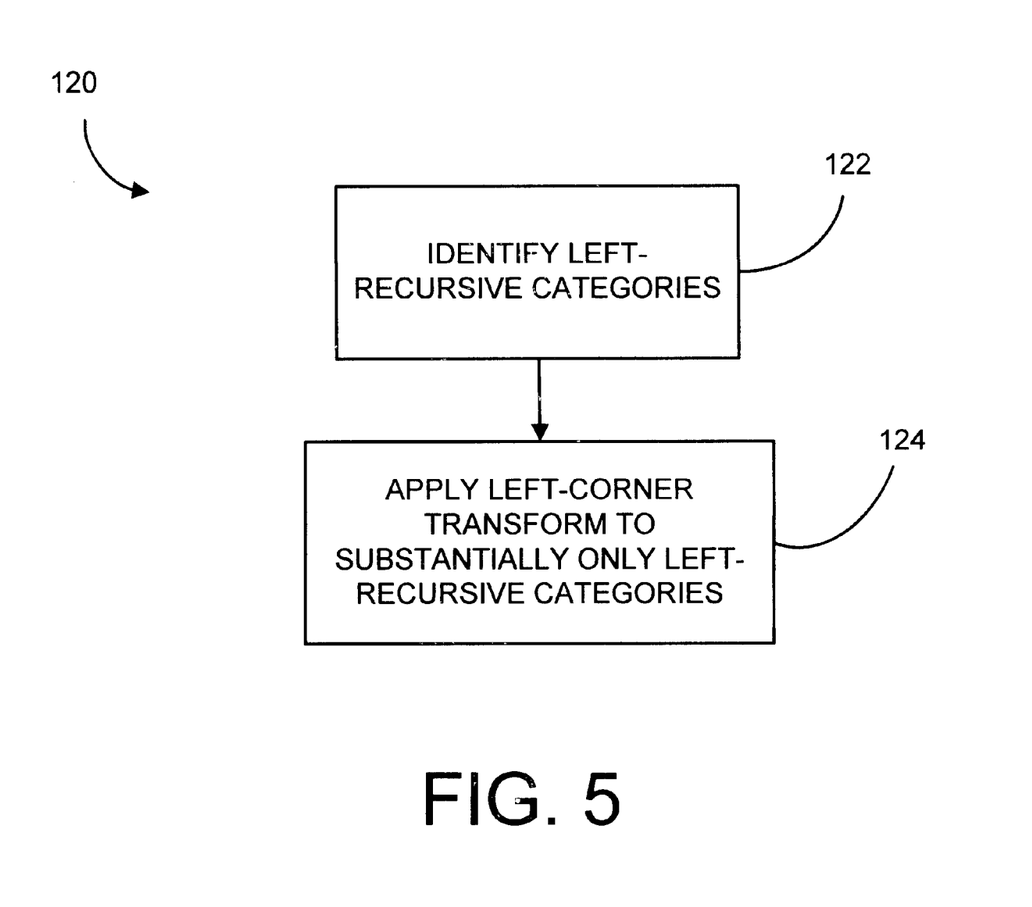
FIG. 5 is a flow chart illustrating a method of the present invention.

Generally, a method 120 for transforming a first set of rule expressions forming a first grammar to a second set of rule expressions forming a second grammar, according to one aspect of the present invention includes, as illustrated in FIG. 5, identifying at least one left-recursive category of the first grammar at step 122, and applying the left-corner transform to substantially only the left-recursive category rule expressions of the first grammar to form the second grammar. Identifying left-recursive categories in the first grammar can be performed using well-known techniques. A category is left recursive if it is a proper left-corner of itself. In other words, if a category "A" can start with an "A" directly or, indirectly via other rule expressions for other categories, then category A is left recursive.

Having identified the left-recursive categories, the rule expressions of the left-corner transform provided above are applied substantially only to the left-recursive categories. Specifically, categories "A" and "B" range only over left-recursive categories identified in step 122 and "a" will range over words and non-left-recursive categories. In addition, new categories of the form A-X are only created if "X" is a proper left-corner of "A" taking into account only rule expressions that have a left-recursive category symbol on the left-hand side of the rule expression. In addition, in the resulting grammar, all rule expressions of the original grammar having a non-left-recursive category on the left-hand side of the rule expression are included.

Typically, the number of left-recursive categories and associated rule expressions are small compared to the total number of categories and rule expressions in the grammar. Thus, one could realize the benefits of the invention by merely applying the left-corner transform to some non-left-recursive categories in addition to the left-recursive categories. The method 120 includes applying the left-corner transform to substantially only the left-recursive categories. As used herein, this language is intended to allow some application of the left-corner transform to non-left-recursive categories and rule expressions but less than all of the non-left-recursive categories and rule expressions. In one embodiment, the method includes application of the left-corner transform to up to 50% of the non-left-recursive categories or rule expressions. In a further embodiment, the allowable percentage is up to 30%. In yet a further embodiment, the allowable percentage is up to 10%.

An alternative method is to separate the left-recursive categories into subsets that define particular left-recursive cycles, and apply the left corner transform separately to the rule expressions defining the categories in each cycle. A left-recursive cycle is one or more categories that are passed through in establishing that a category is a proper left-corner of itself. FIG. 1 illustrates a left-recursive cycle wherein a noun phrase (NP) can start with a determiner (DET), and a determiner can start with a noun phrase, thus, the rule expressions for the noun phrase and the determiner form a left-recursive cycle.

Figure 6:
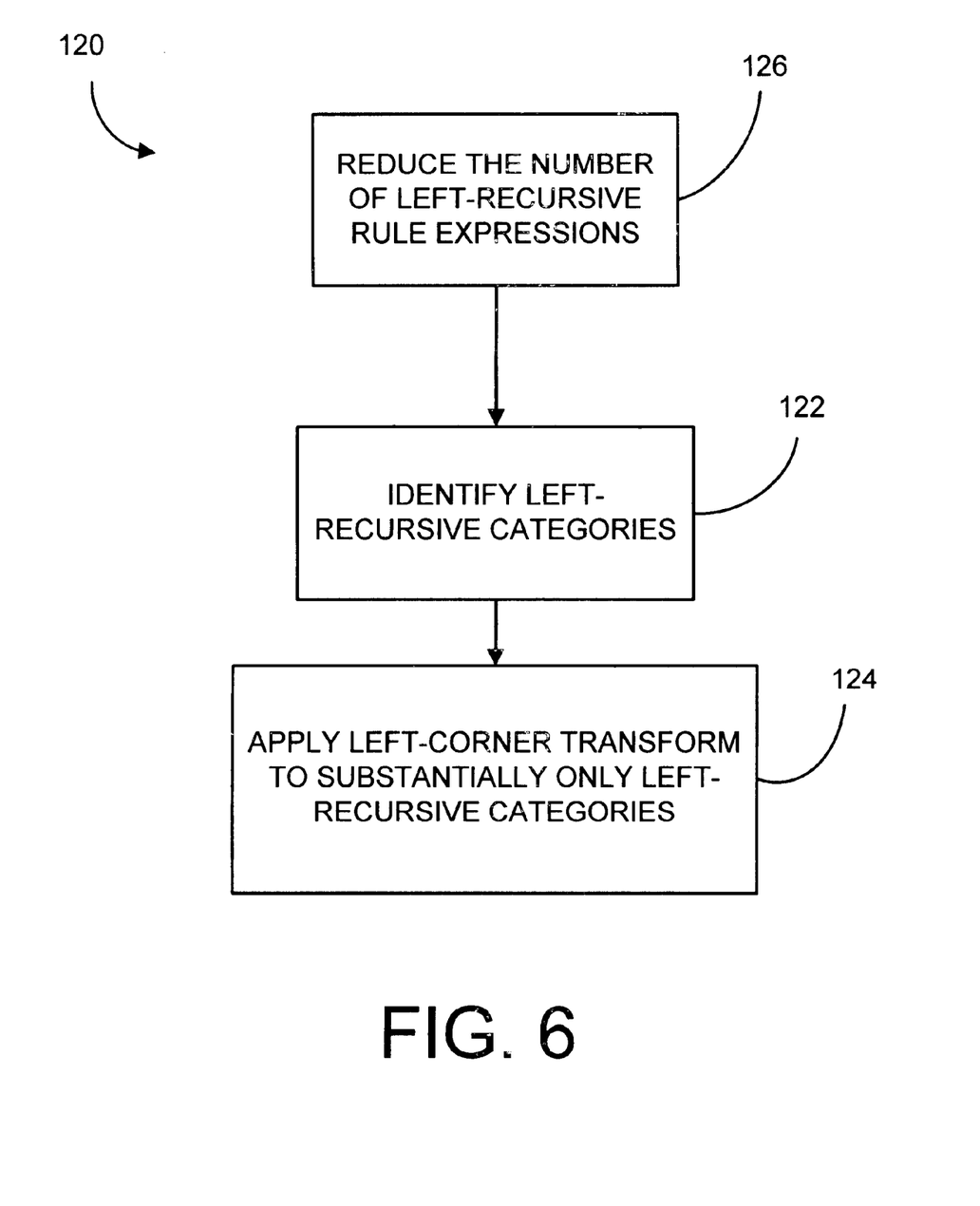
FIG. 6 is a flow chart illustrating the method with an additional optional step.

In FIG. 6, the method 120 includes an additional step 126 of reducing the number of rule expressions in the grammar having a left-recursive category on a lefthand side of an rule expression. In particular, two methods can be used separately or in combination to reduce the number of left-recursive category rule expressions in the first grammar. In a first method, the step of reducing the number of left-recursive rule expressions in the first grammar comprises replacing a set of rule expressions of the form, $$A \to \alpha\beta_1, \ldots, A \to \alpha\beta_n$$

with $$A \to \alpha A/\alpha, A/\alpha \to \beta_1, \ldots, A/\alpha \to \beta_n$$

Where A is a category, α is any sequence of one or more words and/or categories of the first grammar, and $\beta_1$ through $\beta_n$ are each a sequence (possibly a null sequence) of words and/or categories of the first grammar, and A/α represents a new unique category expression for each distinct combination of A and α. This method reduces the number of rule expressions for original categories in the first grammar, but introduces rule expressions for new categories. Nevertheless, in general, the total size of the resulting grammar will be reduced. More importantly, since none of the new categories introduced will be left recursive, the total number of rule expressions for left-recursive categories is reduced. This step of reducing the number of left-recursive rule expressions is performed before applying the left-corner transform, which will thereby reduce the number of rule expressions that the left-corner transform is applied to.

As discussed above, in one embodiment, the foregoing step can be applied to new categories, which have been created by this transformation. This will generally result in the most compact resulting grammar. However, in the alternative, the foregoing transform may be applied only to categories of the first grammar, or only to the left-recursive categories of the first grammar. Application of the first transformer in this manner will result in reducing the number of left-recursive rule expressions before applying the leftcorner transform; however, these alternative methods will not result in the most compact grammar.

For purposes of this description, the foregoing method of reducing the number of left-recursive categories on the left-hand side of the rule expression is herein referred to as a "prefix-merge transformation".

A second method for reducing the number of rule expressions in the first grammar having a left-recursive category on the left-hand side of the rule expression includes merging non-left-recursive rule expressions for left-recursive categories. In particular, this method includes:

replacing a set of rule expressions of the form, $$A \to X_1\beta_1, \ldots, A \to X_n\beta_n$$

with $$A \to A\text{-non-left-rec } A\text{-non-left-rec} \to X \beta_1 \ldots A\text{-non-left-rec} \to X_n \beta_n$$

where A is a left-recursive category, $X_1 \ldots X_n$ are each any word or non-left-recursive category of the first grammar, $\beta_1$ through $\beta_n$ are each a sequence (possibly a null sequence) of words and/or categories of the first grammar, and A-nonleft-rec represents a unique category expression for each distinct A. This method reduces the number of rule expressions for the left-recursive category A by n−1, which reduces the total number of rule expressions for left-recursive categories by a similar number, since A-non-left-rec is never a left-recursive category. This transform of merging non-left-recursive rule expressions for left-recursive categories is a second broad aspect of the present invention and can be practiced separately from application of the left-corner transform, if desired.

Figure 7:
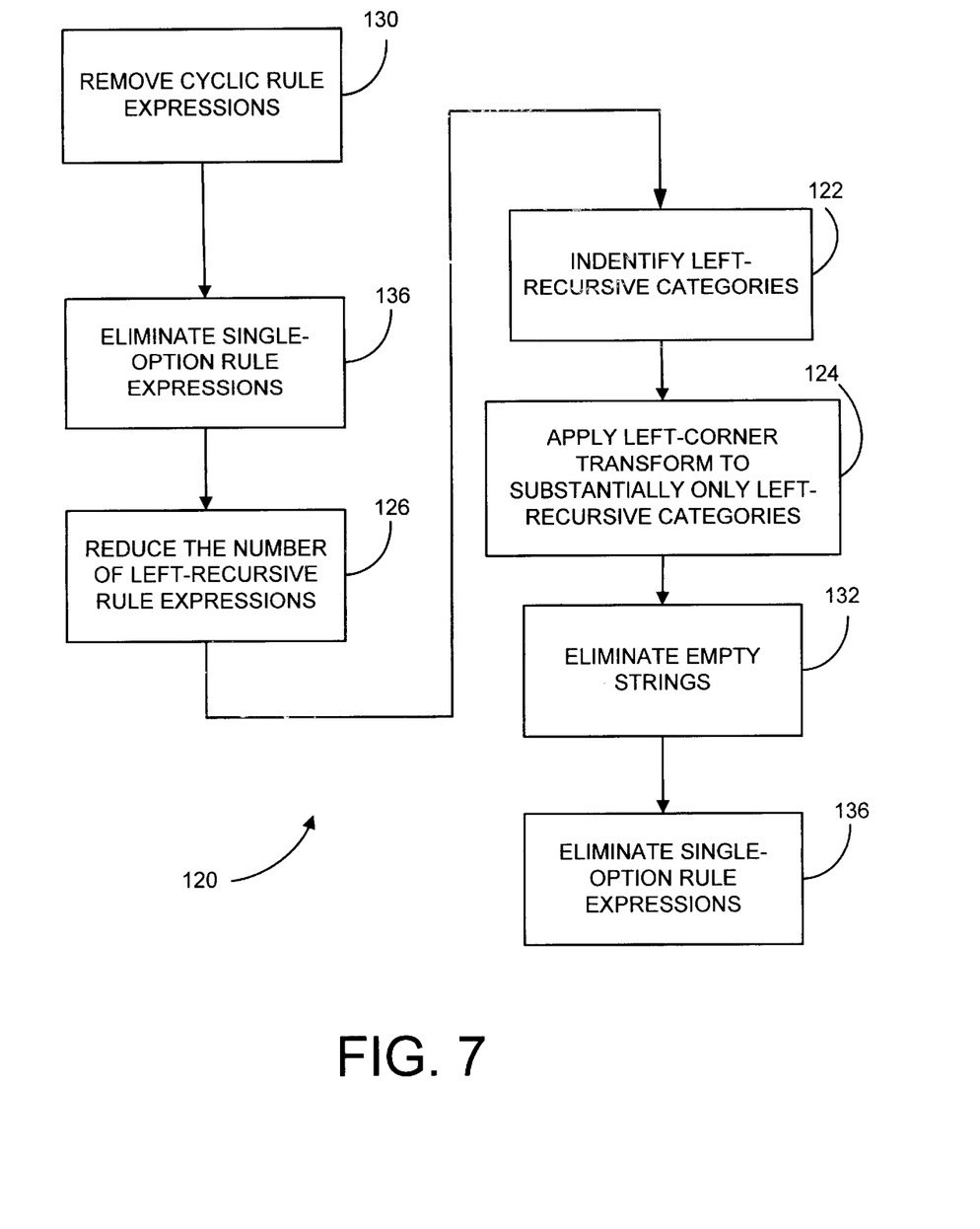
FIG. 7 is a flow chart illustrating the method with additional optional steps.

FIG. 7 illustrates yet additional steps that can be performed in the method for building a language model by transforming a first set of rule expressions forming a first grammar to a second set of rule expressions forming a second grammar. In addition to the steps described above, which have been similarly numbered, the method 120 can include a step 130 to transform the first or original grammar to be noncyclic. It should be noted the grammar should be noncyclic to apply the left-corner transform. A grammar is noncyclic provided that it contains no sequence of rules of the form;

$$A_1 \to A_2, \ldots, A_{n-1} \to A_n, A_n \to A_1$$

In other words, the grammar is noncyclic if there is no sequence of rules that allows a derivation of a category from itself. As known to those skilled in the art, any context-free grammar can be transformed to be noncyclic by well-known methods. Therefore, if necessary, the method 120 can include transforming the original grammar to be noncyclic, identifying left-recursive categories and then applying the left-corner transform, with or without the methods of step 126 to reduce the number of left-recursive rule expressions.

Both the prefix-merge transform and the leftcorner transform can introduce rule expressions of the form A→ε into the resulting grammar where "A" is a category and ε is an empty string. In general, the resulting grammar will be most compact if left in this form, but speech recognition systems and other top-down language processing systems often do not accept such rule expressions in grammars defining language models. However, the resulting grammar can be further transformed to eliminate such rule expressions using well known methods.

Briefly, one method to eliminate empty string rule expressions includes identifying all the categories that can derive the empty string directly (e.g. A→ε) or indirectly (e.g. A→B, B→ε). This step includes listing as "possibly empty" all the categories C that have a rule expression of the form C→ε. Then, for every rule expression whose right hand side consists of a sequence of categories that have all been listed as "possibly empty", list the category on the left hand side as "possibly empty", and repeat until no more categories can be listed as "possibly empty".

All categories that can derive a nonempty string directly or indirectly are also listed. This step includes listing as "possibly nonempty" all the categories that occur on the left hand side of a rule expression that has a terminal symbol (i.e., a word) somewhere on the right hand side. Then, for every rule expression whose right hand side includes at least one category that has been listed as "possibly nonempty", list the category on the left hand side as "possibly nonempty", and repeat until no more categories can be listed as "possible nonempty".

With the foregoing lists established, each rule in the original grammar is examined and variations are generated (to be included in the transformed grammar) by going through the right hand side of the rule expression one symbol at a time. If a right-hand-side symbol is a terminal symbol, include it in all variations of the original rule. If a right-hand-side nonterminal symbol is not "possibly empty", include it in all variations; and if it is not "possibly nonempty", omit it from all variations. If a right-hand-side nonterminal symbol is both "possibly empty" and "possibly nonempty", then make two sets of variations (one set that includes the symbol and one set that omits it). Generate all possible variations of the original rule that satisfy these constraints, and include in the transformed grammar all those that have something more than the empty string on the right-handside. As appreciated by those skilled in the art, other known methods of eliminating empty string rule expressions can also be used. The method 120 of FIG. 7 illustrates at step 132 elimination of empty string rule expressions.

FIG. 7 further illustrates steps 136 herein referred to as elimination of "single-option chain rule expressions". A "single-option chain rule expression" exists if only one rule expression is present in the grammar to define a category and that rule expression has only one word or category on the right-hand side, for example A→B. Since category A is defined by only one rule expression, category B can be substituted for category A in any of the other rule expressions present in the grammar. The rule expression A→B can then be removed from the grammar. Step 136 can be performed anywhere in the method 120 of FIG. 6. However, by performing step 136 near the beginning of the method 120, the grammar is made smaller for processing, whereas performing step 136 at the end of the method 120 can significantly reduce the number of rule expressions present in the resulting grammar.

By identifying left-recursive categories in a grammar and applying the left-corner transform to substantially only the left-recursive categories, the grammar can be easily transformed without dramatic increases in the size of the resulting grammar. This allows language models to be more easily built for topdown language processing systems. In this manner, one can write a set of rule expressions defining a grammar without regard to left recursion wherein the grammar can then be transformed into a form that is well-suited for the language processing system. In further embodiments, the number of left-recursive rule expressions can be reduced prior to application of the left-corner transform. In many cases, the resulting grammar is smaller than the original grammar because the step of reducing the number of left-recursive rule expressions shrinks the grammar considerably. Although the left-corner transform will expand the number of rule expressions, when restricted substantially to only left-recursive categories, the resulting grammar can be still more compact than the original.

Although the present invention has been described with reference to particular embodiments, workers skilled in the art will recognize that changes may be made in form and detail without departing from the spirit and scope of the invention.

What is claimed is:

1. A method for transforming a first set of rule expressions forming a first grammar to a second set of rule expressions forming a second grammar for use as a language model in a language processing system, the method comprising:
   identifying at least one left-recursive category of the first grammar; and
   applying a left-corner transform to substantially only the left-recursive category rule expressions of the first grammar in forming the second grammar.

2. The method of claim 1 and further comprising:
   reducing the number of rule expressions in the first grammar having a left-recursive category on a left-hand side of an rule expression.

3. The method of claim 2 wherein the step of reducing the number of rule expressions in the first grammar having the left-recursive category on the left-hand side of the rule expression comprises:

replacing a set of rule expressions of the form, $$A \to \alpha\beta_1, \ldots, A \to \alpha\beta_n$$

with $$A \to \alpha A/\alpha,\ A/\alpha \to \beta_1, \ldots, A/\alpha \to \beta_n$$

where A is a category, $\alpha$ is any sequence of one or more words and/or categories of the first grammar, $\beta_1 \ldots \beta_n$ are each a sequence (possibly a null sequence) of words and/or categories of the first grammar, and $A/\alpha$ represents a new unique category for each distinct combination of A and $\alpha$.

4. The method of claim 3 wherein the step of reducing the number of rule expressions in the first grammar having the left-recursive category on the left-hand side of the rule expression is performed before the step of identifying at least one left-recursive category of the first grammar.

5. The method of claim 3 wherein the step of reducing the number of rule expressions in the first grammar having the left-recursive category on the left-hand side of the rule expression is performed after the step of identifying at least one left-recursive category of the first grammar.

6. The method of claim 3 wherein the step of reducing the number of rule expressions in the first grammar having the left-recursive category on the left-hand side of the rule expression further comprises:

replacing a set of rule expressions of the form, $$A \to X_1\beta_1, \ldots, A \to X_n\beta_n$$

with $$A \to A\text{-non-left-rec}\ A\text{-non-left-rec} \to X_1\beta_1 \ldots A\text{-non-left-rec} \to X_n\beta_n$$

where A is a left-recursive category, $X_1 \ldots X_n$ are each any word or non-left-recursive category of the first grammar, $\beta_1 \ldots \beta_n$ are each a sequence (possibly a null sequence) of words and/or categories of the first grammar, and A-non-left-rec represents a unique category expression for each distinct A.

7. The method of claim 6 and further comprising:

deleting any rule expression of the form, $A \to B$, from the first grammar, where A occurs only once on the left-hand side within the set of rule expressions in the first grammar and B is a single word or category of the first grammar; and replacing the category A with B for each occurrence of A in the first grammar.

8. The method of claim 6 and further comprising:

transforming the second grammar to eliminate rule expressions of the form $A \to \epsilon$, where A is a category and $\epsilon$ is an empty string.

9. The method of claim 8 and, after transforming the second grammar to eliminate rule expressions of the form $A \to \epsilon$, further comprising:

deleting any rule expression of the form $A \to B$ from the second grammar, where A occurs only once on the left-hand side within the set of rule expressions in the second grammar and B is a single word or category of the second grammar; and replacing the category A with B for each occurrence of A in the second grammar.

10. The method of claim 1 and further comprising:

transforming the second grammar to eliminate rule expressions of the form $A\epsilon\epsilon$, where A is a category and $\epsilon$ is an empty string.

11. The method of claim 2 wherein reducing the number of rule expressions in the first grammar having the left-recursive category on the left-hand side of the rule expression comprises:

replacing a set of rule expressions of the form, $$A \to X_1\beta_1, \ldots, A \to X_n\beta_n$$

with $$A \to A\text{-non-left-rec} A\text{-non-left-rec} \to X_1\beta_1 \ldots A\text{-non-left-rec} \to X_n\beta_n$$

where A is a left-recursive category, $X_1 \ldots X_n$ are each any word or non-left-recursive category of the first grammar, $\beta_1$ through $\beta_n$ are each a sequence (possibly a null sequence) of words and/or categories of the first grammar, and A-non-left-rec represents a unique category expression for each distinct A.

12. The method of claim 2 wherein an original grammar is cyclic, and the method further comprises:

transforming the original grammar to be the first grammar, where the first grammar is noncyclic.

13. A method for transforming a first set of rule expressions forming a first grammar to a second set of rule expressions forming a second grammar for use as a language model in a language processing system, the method comprising:

replacing a set of rule expressions of the form, $$A \to X_1\beta_1, \ldots, A \to X_n\beta_n$$

with $$A \to A\text{-non-left-rec}\ A\text{-non-left-rec} \to X_1\beta_1 A\text{-non-left-rec} \to X_n\beta_n$$

where A is a left-recursive category, $X_1 \ldots X_n$ are each any word or non-left-recursive category of the first grammar, $\beta_1$ through $\beta_n$ are each a sequence (possibly a null sequence) of words and/or categories of the first grammar and A-non-left-rec represents a unique category expression for each distinct A.

14. A computer readable medium including instructions readable by a computer which, when implemented, build a language model for use in a language processing system by transforming a first set of expressions forming a first context-free grammar to a second set of expressions forming a second context-free grammar, the instructions comprising:

identifying at least one left-recursive category of the first grammar; and applying a left-corner transformation to substantially only the left-recursive category expressions of the first grammar in forming the second grammar.

15. The computer readable medium of claim 14 having instructions further comprising:

reducing a number of expressions in the first grammar having a left-recursive category on a left-hand side of an expression.

16. A computer readable medium including instructions readable by a computer which, when implemented, build a language model for use in a language processing system by transforming a first set of expressions forming a first grammar to a second set of expressions forming a second grammar, the method comprising:

replacing a set of expressions of the form, $$A \rightarrow X_1\beta_1, \ldots, A \rightarrow X_n\beta_n$$

with $$A \rightarrow A\text{-non-left-rec } A\text{-non-left-rec} \rightarrow X_1\beta_1 \ldots A\text{-non-left-rec} \rightarrow X_n\beta_n$$

where A is a left-recursive category, $X_1 \ldots X_n$ are each any word or category of the first grammar, $\beta_1 \ldots \beta_n$ are each a non-zero sequence of words and/or categories of the first grammar and A-non-left-rec represents a unique category expression for each distinct A.

* * * * *